Figure 4:
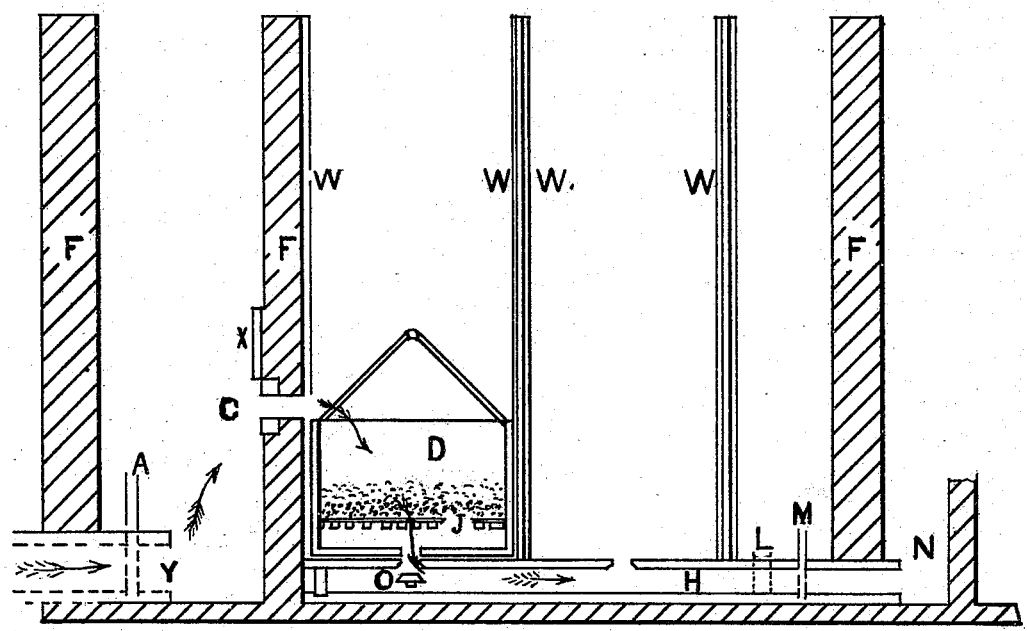

I. B. HOWE & W. C. WEIR.
WATER-FILTER.
No. 173,725. Patented Feb. 22, 1876.
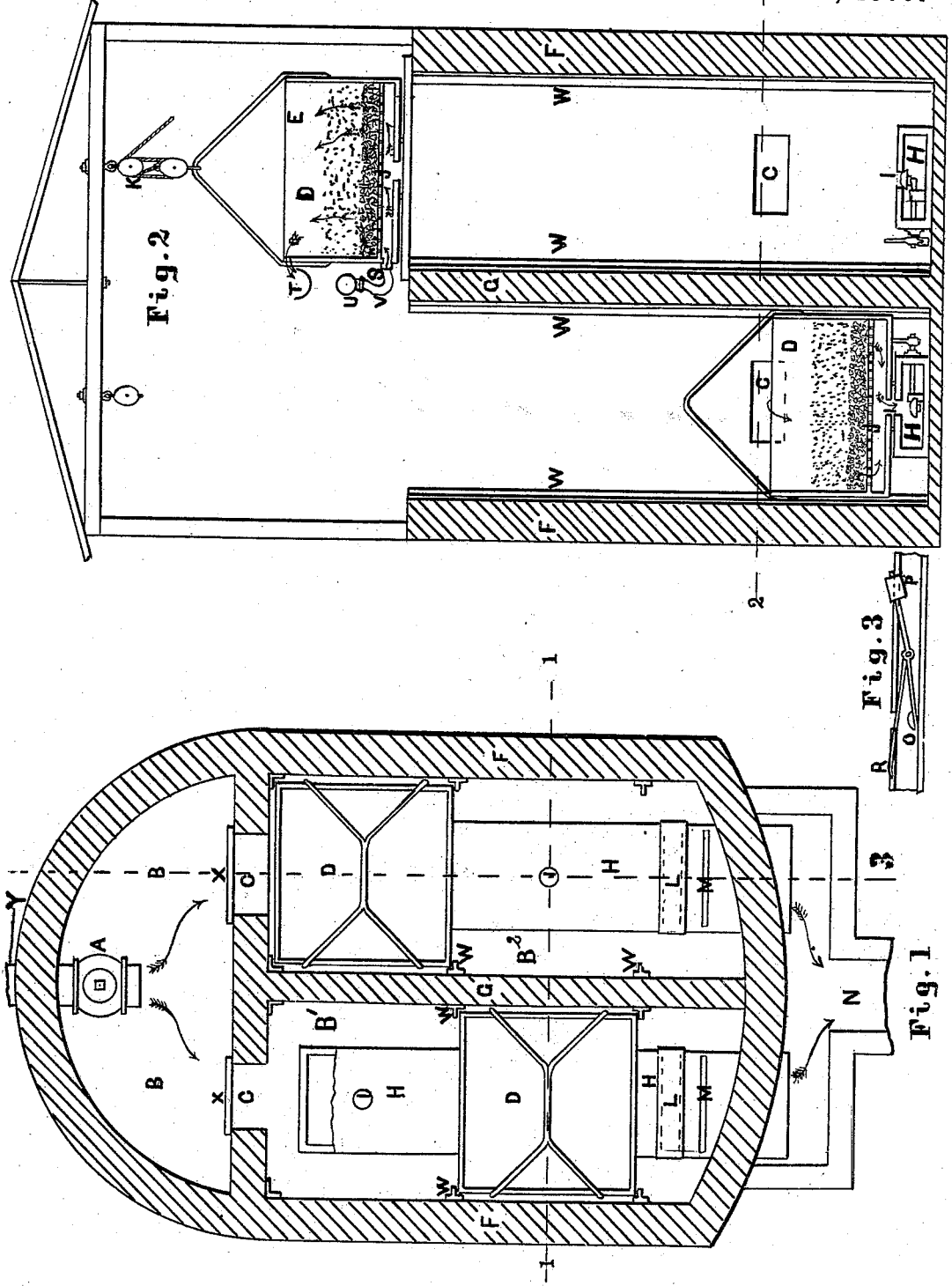

I. B. HOWE & W. C. WEIR.
WATER-FILTER.

No. 173,725.

2 Sheets—Sheet 2.

Patented Feb. 22, 1876

WITNESSES
W. W. Sanborn

INVENTORS
Isaac B. Howe
William C. Weir

UNITED STATES PATENT OFFICE.

ISAAC B. HOWE AND WILLIAM C. WEIR, OF CLINTON, IOWA.

IMPROVEMENT IN WATER-FILTERERS.

Specification forming part of Letters Patent No. 173,725, dated February 22, 1876; application filed October 13, 1875.

*To all whom it may concern:*

Be it known than we, ISAAC B. HOWE and WILLIAM C. WEIR, both of Clinton, in the county of Clinton and State of Iowa, have invented certain new and useful Improvements in Water-Filterers; and we do hereby declare that the following is a full, clear, and exact description thereof, which will enable others skilled in the art to which it pertains to make and use the same, reference being had to the accompanying drawings, and to the letters of reference marked thereon, which form a part of this specification.

The object of our invention is to filter water through sand, charcoal, or other suitable material, and, when said filtering material becomes foul from the impurities filtered from the water, to have the same accessible, for the purpose of renewing, repairing, or cleansing the same.

In the drawings, Figure 1 represents a horizontal section on line 2; Fig. 2, a vertical section on line 1; Fig. 3, a side view of valve arrangement. Fig. 4 represents a vertical section on line 3.

In the different drawings the same letter refers to the same part.

We construct a filter pit or basin, which we divide in three compartments, as indicated by the walls F F and G, Fig. 1, which basin contains the filtering apparatus.

The operation is as follows: The unfiltered water is brought from the supply through the conduit Y into the compartment B, which we call the distributing-chamber. From this it passes into the compartments B¹ B² at a point above the filter-boxes D D, as shown at C, Fig. 4. It then passes through the filtering material in the boxes D D D, &c., entering the conduit H through opening I, and from thence to the pumping well or pipes through conduit N, as indicated by arrows. The conduits H H extend the whole length of the compartments B¹ and B², and under the filter-boxes D D. Each box is constructed with an opening that is in line with an opening in the conduit H, so the water, as it passes through the filtering material, enters through these openings into the conduit H. A gasket, of rubber or other suitable material, is fixed on the bottom of the box D, and rests on conduit H, so as to prevent any water that is unfiltered from passing into conduit H.

In order to cleanse the filtering material or renew it, we construct the box D with two bottoms a little distance apart. The upper one, marked J, is a perforated bottom covered with wire-cloth or other suitable material. The main bottom has an opening over, and corresponding with, the one in conduit H. These boxes may be raised, as shown at E, Fig. 2, or otherwise moved, for purpose of cleansing or renewing the same, the valve O closing the opening I by means of the weight P, or its equivalent, so no unfiltered water can enter the conduit H while the box is raised or moved. After raising the box containing the filtering material to the requisite height, the opening in the bottom of the filter-box being closed by a plug, or otherwise, then, by means of the connecting pipe or hose V, attached to the main pipe U, and opening in the side of filter-box between the bottoms, the pipe U having the requisite amount of pressure from pumps or tank, or their equivalent, the water passes from main U, through pipe or hose V, into space between bottoms, up through the perforated bottom J, and up through filtering material, and out through a side opening into a waste-trough, T, as shown by arrows, carrying with it any impurities that may be deposited on top or in the filtering material. The same operation is gone through with when new material is put in. When the filter-box is lowered to its place it opens the valve O by means of the lever R, or its equivalent. *x x* are valves or gates that open or close the openings C C. M M are gates closing conduit H. By closing these gates either or both compartments may be pumped out for repairs, &c. L L represent gates that open direct to the conduits H H, that unfiltered water may be admitted direct in case of emergency. In cases where the supply of water is of sufficient elevation to run into the filtering pit or basin by natural flow, or otherwise, the material need not be raised, but the pit or basin may be drained, and the material renewed or cleansed, by water-pressure, as before.

What we claim as new is—

A water-filterer, having compartments B B¹ B² and conduits H H, provided with gates L M and valve O, in combination with filter-boxes D, substantially as and for the purposes described.

In testimony that we claim the foregoing as our invention we hereunto affix our signatures in the presence of two witnesses.

ISAAC B. HOWE.
    WM. C. WEIR.

Witnesses:
  WM. W. SANBORN,
  I. MUNROE.